(12) United States Patent
Patel

(10) Patent No.: US 9,849,415 B2
(45) Date of Patent: Dec. 26, 2017

(54) FILTER MEDIA CONSTRUCTION WITH NANOFIBER AND CARBON WEB

(71) Applicant: DONALDSON COMPANY, INC., Minneapolis, MN (US)

(72) Inventor: Kirit Patel, Bridgewater, NJ (US)

(73) Assignee: Donaldson Company, Inc., Minneapolis, MN (US)

(*) Notice: Subject to any disclaimer, the term of this patent is extended or adjusted under 35 U.S.C. 154(b) by 45 days.

(21) Appl. No.: 14/800,485

(22) Filed: Jul. 15, 2015

(65) Prior Publication Data

US 2015/0314226 A1 Nov. 5, 2015

Related U.S. Application Data

(63) Continuation of application No. 13/386,252, filed as application No. PCT/US2010/042930 on Jul. 22, 2010, now Pat. No. 9,108,130.

(Continued)

(51) Int. Cl.
| | |
|---|---|
| *B01D 53/02* | (2006.01) |
| *B01D 46/00* | (2006.01) |
| *B01D 39/16* | (2006.01) |

(52) U.S. Cl.
CPC ......... *B01D 46/0023* (2013.01); *B01D 39/16* (2013.01); *B01D 39/1607* (2013.01);
(Continued)

(58) Field of Classification Search
CPC .............................. B01D 39/16; B01D 39/1607
See application file for complete search history.

(56) References Cited

U.S. PATENT DOCUMENTS

| | | |
|---|---|---|
| 5,391,426 A | 2/1995 | Wu |
| 5,783,086 A | 7/1998 | Scanlon et al. |

(Continued)

FOREIGN PATENT DOCUMENTS

| | | |
|---|---|---|
| CN | 102470304 | 5/2012 |
| EP | 1236494 | 9/2002 |

(Continued)

OTHER PUBLICATIONS

"English Translation of Reconsideration Report," Issued in JP patent application No. 2012-521788 Feb. 5, 2016, 3 pages.

(Continued)

*Primary Examiner* — Christopher P Jones
(74) *Attorney, Agent, or Firm* — Pauly, DeVries, Smith & Deffner LLC

(57) ABSTRACT

Disclosed herein, among other things, is an improved filter media construction that comprises multiple layers for improved odor control that can be used for vacuum cleaner air filtration cartridge applications. The filter media comprises anti-microbial ePTFE HEPA filter media to prevent mold growth. The filter media may also be used for air cleaner filtration, central air filtration for home and industrial buildings (HVAC), cleanrooms, and microelectronic devices. In an embodiment, the improved filter media construction comprises at least a PTFE layer, a bi-component layer, and a base layer. In an embodiment the PTFE layer comprises ePTFE. In an embodiment, the bi-component layer comprises non-woven polyethylene/polyethylene terephthalate (PE/PET). In yet another embodiment, the base layer comprises activated carbon. Other aspects and embodiments are provided herein.

15 Claims, 10 Drawing Sheets

Related U.S. Application Data

(60) Provisional application No. 61/227,784, filed on Jul. 22, 2009.

(52) U.S. Cl.
CPC ..... *B01D 46/0001* (2013.01); *B01D 46/0028* (2013.01); *B01D 46/0036* (2013.01); *Y10T 156/10* (2015.01)

(56) References Cited

U.S. PATENT DOCUMENTS

| | | |
|---|---|---|
| 6,171,375 B1 | 1/2001 | Howie |
| 6,174,350 B1 | 1/2001 | Rohn et al. |
| 6,260,234 B1 | 7/2001 | Wright et al. |
| 6,312,508 B1 | 11/2001 | Alberts, III et al. |
| 6,361,587 B1 | 3/2002 | Rohn et al. |
| 6,395,046 B1 | 5/2002 | Emig et al. |
| 6,432,180 B2 | 8/2002 | Alberts, III et al. |
| 6,463,622 B2 | 10/2002 | Wright et al. |
| 6,565,637 B2 | 5/2003 | Alberts, III et al. |
| 6,569,217 B1 | 5/2003 | Demarco |
| 6,596,044 B1 | 7/2003 | Bilek et al. |
| 7,048,773 B2 | 5/2006 | Riedel et al. |
| 7,094,270 B2 | 8/2006 | Schultink et al. |
| 7,114,216 B2 | 10/2006 | Stephens et al. |
| 7,131,165 B2 | 11/2006 | Wright et al. |
| RE39,473 E | 1/2007 | Salo et al. |
| 7,329,295 B2 | 2/2008 | Greene et al. |
| 7,341,611 B2 | 3/2008 | Greene et al. |
| 8,573,438 B1 | 11/2013 | Cheng |
| 9,108,130 B2 | 8/2015 | Patel |
| 2001/0015132 A1 | 8/2001 | Rohn et al. |
| 2001/0039692 A1 | 11/2001 | Wright et al. |
| 2001/0042442 A1 | 11/2001 | Alberts, III et al. |
| 2001/0047721 A1 | 12/2001 | Scanlon |
| 2002/0139744 A1 | 10/2002 | Choi |
| 2002/0152893 A1 | 10/2002 | Alberts, III et al. |
| 2003/0010210 A1 | 1/2003 | Kawano et al. |
| 2003/0037406 A1 | 2/2003 | Wright et al. |
| 2003/0131571 A1 | 7/2003 | Demarco |
| 2004/0016078 A1 | 1/2004 | Wright et al. |
| 2004/0095141 A1 | 5/2004 | Watanabe et al. |
| 2005/0028501 A1 | 2/2005 | Riedel et al. |
| 2005/0055796 A1 | 3/2005 | Wright et al. |
| 2005/0079379 A1 | 4/2005 | Wadsworth et al. |
| 2005/0193696 A1 | 9/2005 | Muller et al. |
| 2005/0223519 A1 | 10/2005 | Greene et al. |
| 2005/0223520 A1 | 10/2005 | Greene et al. |
| 2006/0075896 A1 | 4/2006 | Andersson |
| 2006/0174597 A1 | 8/2006 | Greene |
| 2006/0207230 A1 | 9/2006 | Demarco |
| 2007/0044442 A1 | 3/2007 | Riedel et al. |
| 2007/0056136 A1 | 3/2007 | Stephens et al. |
| 2007/0209144 A1 | 9/2007 | Fester et al. |
| 2007/0227359 A1 | 10/2007 | Choi et al. |
| 2009/0065436 A1 | 3/2009 | Kalayci et al. |
| 2009/0090245 A1 | 4/2009 | Olszewski |
| 2009/0117367 A1 | 5/2009 | Stone et al. |
| 2009/0211581 A1 | 8/2009 | Bansal |
| 2009/0239435 A1 | 9/2009 | Davis et al. |
| 2009/0247970 A1 | 10/2009 | Keleny et al. |
| 2009/0266048 A1 | 10/2009 | Schwarz |
| 2010/0139224 A1 | 6/2010 | Lim et al. |
| 2010/0269464 A1 | 10/2010 | Mori et al. |
| 2013/0125757 A1 | 5/2013 | Patel |

FOREIGN PATENT DOCUMENTS

| | | |
|---|---|---|
| GB | 2288749 | 11/1995 |
| GB | 2359984 | 9/2001 |
| GB | 2435820 | 9/2007 |
| JP | H05-063608 | 3/1993 |
| JP | H07016409 | 1/1995 |
| JP | 2000176226 | 6/2000 |
| JP | 2002370020 | 12/2002 |
| JP | 2004159984 | 6/2004 |
| JP | 2004532098 | 10/2004 |
| JP | 2006110493 | 4/2006 |
| JP | 2007301436 | 11/2007 |
| JP | 2008279359 | 11/2008 |
| JP | 2013500150 | 1/2013 |
| WO | 9215382 | 9/1992 |
| WO | 0066247 | 11/2000 |
| WO | 02076276 | 10/2002 |
| WO | 2005034659 | 4/2005 |
| WO | 2005089615 | 9/2005 |
| WO | 2006086712 | 8/2006 |
| WO | 2007074997 | 7/2007 |
| WO | 2007124521 | 11/2007 |
| WO | 2007124522 | 11/2007 |
| WO | 2007137126 | 11/2007 |
| WO | 2008109117 | 9/2008 |
| WO | 2011011620 | 1/2011 |

OTHER PUBLICATIONS

"Communication under rule 71(3) EPC," for European Patent Application No. 10737719.4, mailed Dec. 12, 2014 (7 pages).
"Decision of Rejection," for Japanese Patent Application No. 2012-521788, mailed on Jul. 7, 2015 (5 pages) with English Summary.
"Final Office Action," for U.S. Appl. No. 13/386,252, mailed on Dec. 26, 2014 (13 pages).
"Final Rejection," for Chinese Patent Application No. 201080032259.4, mailed Apr. 23, 2015 (21 pages) with English Translation.
"First Office Action," for Chinese Patent Application No. 201080032259.4, mailed Nov. 20, 2013 (9 pages).
"International Search Report and Written Opinion," for PCT/US2010/042930, mailed Dec. 15, 2010 (10 pages).
"Non-Final Office Action," for JP Application No. 2012-521788, mailed Jun. 3, 2014 (8 pages) with English translation.
"Non-Final Office Action," for U.S. Appl. No. 13/386,252, mailed Jul. 14, 2014 (19 pages).
"PCT Notification Concerning Transmittal of International Preliminary Report on Patentability," from International Application No. PCT/US2010/042930, corresponding to U.S. Appl. No. 61/227,784, mailed Feb. 2, 2012 (7 pages).
Response filed in U.S. Appl. No. 13/386,252, submitted to USPTO on Feb. 26, 2015 (8 pages).
"Second Office Action," for China Patent Application No. 201080032259.4, mailed Oct. 11, 2014 (19 pages) with English translation.
"Final Office Action," for Japanese Patent Application No. 2015-218869 mailed Nov. 8, 2016 (2 pages), English translation.
"First Office Action," for Chinese Patent Application No. 201510983191.2 dated Mar. 3, 2017 (12 pages) with English translation.

| Run Time Hours | Ammonia concentration ppm(v) in sealed static chamber | | |
|---|---|---|---|
| | Natural Outgas- Dust only (empty) | Sample sheet L | Sample Sheet LC |
| 0 | 0.0 | <0.5 | <0.5 |
| 2 | 0.9 | <0.5 | <0.5 |
| 4 | 2.1 | <0.5 | <0.5 |
| 6 | 4.2 | <0.5 | <0.5 |
| 8 | 7.5 | <0.5 | <0.5 |
| 10 | 9.1 | <0.5 | <0.5 |
| 12 | 11.3 | <0.5 | <0.5 |
| 14 | 13.0 | <0.5 | <0.5 |
| 16 | 15.0 | <0.5 | <0.5 |
| 18 | 16.0 | <0.5 | <0.5 |
| 20 | 17.0 | <0.5 | <0.5 |
| 22 | 18.0 | <0.5 | <0.5 |
| 24 | 19.0 | <0.5 | <0.5 |

FIG. 8A

| Run Time Hours | H2S concentration ppm(v) in sealed static chamber | | |
|---|---|---|---|
| | Natural Outgas- Dust only (empty) | Sample sheet R | Sample Sheet RC |
| 0 | 0.0 | <0.5 | <0.5 |
| 2 | 6.4 | <0.5 | <0.5 |
| 4 | 9.4 | <0.5 | <0.5 |
| 6 | 12.0 | <0.5 | <0.5 |
| 8 | 16.0 | <0.5 | <0.5 |
| 10 | 19.0 | <0.5 | <0.5 |
| 12 | 23.0 | <0.5 | <0.5 |
| 14 | 25.0 | <0.5 | <0.5 |
| 16 | 27.0 | <0.5 | <0.5 |
| 18 | 29.0 | <0.5 | <0.5 |
| 20 | 31.0 | <0.5 | <0.5 |
| 22 | 30.0 | <0.5 | <0.5 |
| 24 | 29.0 | <0.5 | <0.5 |

FIG. 8B

FILTER MEDIA CONSTRUCTION WITH NANOFIBER AND CARBON WEB

CROSS REFERENCE TO RELATED APPLICATIONS

This application is a continuation of U.S. application Ser. No. 13/386,252, filed Jul. 31, 2012, which is the national phase application of PCT International Patent Application No. PCT/US2010/042930 filed on Jul. 22, 2010, which claims priority to U.S. Provisional Patent Application Ser. No. 61/227,784, filed Jul. 22, 2009, the contents of which is incorporated by reference herein.

TECHNICAL FIELD

The present invention relates generally to a layered filter media.

BACKGROUND OF THE INVENTION

Allergy sufferers and those with respiratory conditions are often sensitive to particulate materials in the air. Vacuum cleaners and air cleaner filtration devices seek to remove particulate materials in homes and places of business, requiring filters to trap these particles. Without such filters, vacuum cleaners would simply re-circulate the particulate matter back into the air. Industrial dust collection equipment is required to remove greater proportions of smaller and smaller particles from process air streams due to increasingly stringent regulatory requirements. Gas turbine intake filtration systems also must remove quantities of very small particles as the presence of such particles can cause irreparable damage to turbine blades. The cleanliness of an environment, the health of its occupants, the effectiveness of industrial processes, the maintenance of industrial equipment, and the overall aesthetics of living require that submicron particulate materials be readily removed by filter from an air stream.

In order to achieve submicron particulate removal from air streams passing through such systems, inertial separators tend to simply place a physical barrier in the path of particulate material that is then knocked from the air stream into a collection bin. Paper bag dust collectors are simply filters based on paper filter technologies in a bag form. Such paper bags typically simply fit across the air stream for the purpose of separating particulate from the air stream.

Newer filters have been designed with a collection filter or a flat panel or cylindrical cartridges. In these applications, a HEPA filtering material is used. By definition, HEPA filters remove at least 99.97% of airborne particles 0.3 µm in diameter or larger. Because of their general reliability and high level of performance, HEPA filters are often used to minimize the release of radioactive materials, asbestos, lead, beryllium, and other toxic particulates. In vacuum cleaners, HEPA filters are used for air pollution control. Often HEPA structures include an expanded PTFE (ePTFE), layer with a layer of a melt blown fiber combined in a filter construction, or a cellulose filter paper layer with a layer of melt blown fiber combined in a filter construction. These structures are often cleaned by rapping the filter or by blowing filter cake or particulate from the filter using compressed air streams.

The filtration efficiency and cleanability of newer filters is important. These filters must be able to remove dust and dirt but must be easily cleanable without damage to the filter. Often cleaning dirty filters by rapping the filter on a solid object to dislodge dust and dirt can cause the filter media to fail or can cause multilayered elements to delaminate, thus causing the filter to fail through the formation of a pathway for the dust and dirt through the filter structure. Another failure mode occurs when fine dust particles are trapped into the depth of the filter media, such that the dust cannot be dislodged by typical filter cleaning mechanisms, resulting in reduced vacuum power and shorter filter life.

One example of a dust filter vacuum technology using a fine fiber layer in a vacuum bag is Emig et al., U.S. Pat. No. 6,395,046. One example of a filter cartridge in a wet/dry vacuum using expanded PTFE is Scanlon et al., U.S. Pat. No. 5,783,086. Filter materials, such as scrimmed HEPA media, often have high efficiency but often have short lifetimes and can be degraded through water exposure.

There remains a need for a filter media construction suitable for removing odor while maintaining a lower pressure drop and higher efficiency. Additionally, there exists a need for a filter media construction that provides HEPA efficiency, odor control, and anti-microbial treatment with a single medium to control mold growth in cartridge media.

SUMMARY OF THE INVENTION

The present invention relates generally to multi-layered HEPA filter media for improved odor control and filtering. The present invention provides a multi-layered anti-microbial ePTFE HEPA filter media for improved odor control. The media is specifically designed for vacuum cleaner air filtration cartridge application, but it can also be used for a variety of other filtration systems. Such systems include but are not limited to air cleaner filtration, central air filtration for home and industrial buildings (HVAC), clean rooms, and microelectronic devices.

The filter media construction typically comprises at least three layers: an upstream media layer, a bi-component polyethylene/polyethylene terephthalate (PE/PET) layer, and a base layer. In one embodiment, PTFE is used for the upstream media layer. In another embodiment, the PFTE used for the upstream media layer is expanded PTFE (ePTFE). The ePTFE film layer provides several important benefits to the filtration media, including HEPA efficiency and tap cleanability with minimal pressure drop at HEPA efficiency. In an embodiment, the bi-component layer comprises non-woven polyethylene/polyethylene terephthalate (PE/PET). In certain embodiments the base layer comprises activated carbon.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present invention is defined by the appended claims and their legal equivalents.

BRIEF DESCRIPTION OF THE DRAWINGS

The invention may be more completely understood in connection with the following drawings, in which:

FIG. 8A shows test results from conducting off-gassing tests where media made in accordance with the invention was challenged with ammonia FIG. 8B shows test results from conducting off-gassing tests where media made in accordance with the invention was challenged with $H_2S$.

While the invention is susceptible to various modifications and alternative forms, specifics thereof have been shown by way of example and drawings, and will be described in detail. It should be understood, however, that the invention is not limited to the particular embodiments described. On the contrary, the intention is to cover modifications, equivalents, and alternatives falling within the spirit and scope of the invention.

DETAILED DESCRIPTION OF THE INVENTION

The market for general-purpose vacuum cleaners and for wet/dry vacuum systems has imposed increasingly high standards of performance for the vacuum cleaners and their filters over recent years. The devices are required to remove greater and greater proportions of smaller and smaller particles from streams obtained by the vacuum cleaner from often-harsh wet or dry environments in the home, garage, basement, shop, yard, and a variety of industrial environments. The increased requirements satisfy needs for improved health, reduced allergies, improved cleanability, reduced ambient particle counts, and other requirements for home, shop, and industrial environments.

The prior art filter media has had adequate performance in assigned roles in filtration equipment and processes. However, these media all suffer from various problems. At present, filter technology provides odor control, but improved odor control is desired. Damp filters often facilitate unwanted mold and mildew growth on the filters. The mold in turn produces mold spores, which can add pollution to the air. Additionally, it is typical that filters that can achieve a desired efficiency for residential or other non-industrial applications often result in a pressure drop across the filter media that is too high for the applications.

The present invention provides a multi-layered anti-microbial ePTFE HEPA filter media for improved odor control. The media is specifically designed for vacuum cleaner air filtration cartridge application, but it can also be used for a variety of other filtration systems. Such systems include but are not limited to air cleaner filtration, central air filtration for home and industrial buildings (HVAC), cleanrooms, and microelectronic devices.

Filter Construction

Figure 1:
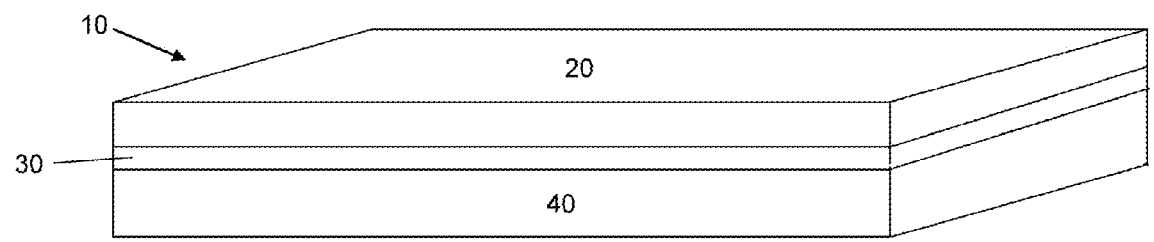
FIG. 1 is a schematic front perspective view of the filter construction in accordance with the present invention.

Referring to FIG. 1, the filter media construction 10 of an example embodiment comprises at least three layers: an upstream media layer 20, a bi-component (PE/PET) layer 30, and a base layer 40. In use, air flow starts from the upstream media layer 20, passes through the bi-component layer 30, and exits through the base layer 40.

In one embodiment, PTFE is used for the upstream media layer 20. In a typical embodiment, the PFTE used for the upstream media layer 20 is expanded PTFE (ePTFE). The ePTFE film layer provides several important benefits to the filtration media, including optional HEPA efficiency and tap cleanability with minimal pressure drop at HEPA efficiency. HEPA efficiency is defined as a minimum 99.97% at 0.3 micron particles (U.S. standard).

In one embodiment, the base layer 40 comprises an activated carbon layer, and the upstream media layer 20 is ePTFE. In another embodiment, the activated carbon layer comprises a minimum of 45% activated carbon. The ePTFE filtration layer is bonded using a low melt bi-component layer 30 with carbon based media under heat and pressure.

Figure 2:
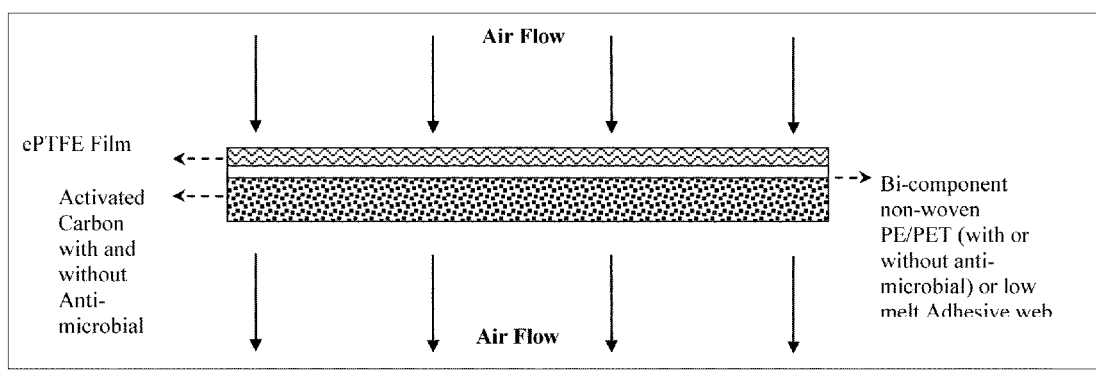
FIG. 2 is a cross sectional view of a multi-layered filter media in accordance with an embodiment of the invention.
Figure 3:
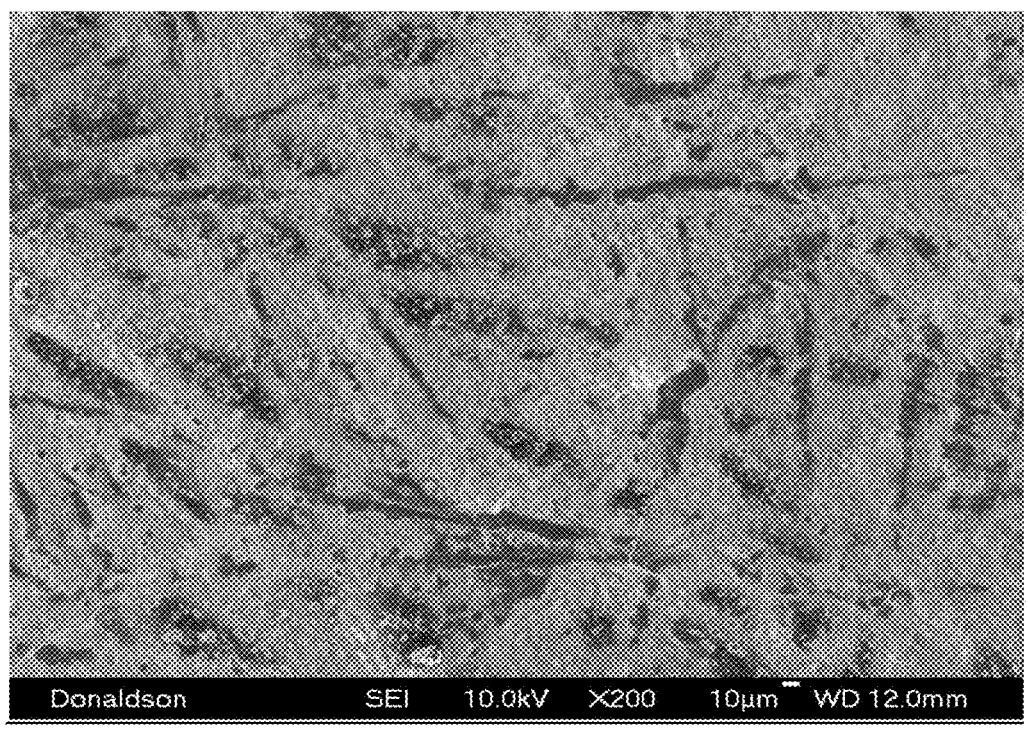
FIG. 3 is a scanning electron microscope micrograph of the filter media shown in FIG. 2.

FIG. 2 shows one embodiment of the present invention where the upstream media layer 20 comprises ePTFE film, the bi-component layer 30 is non-woven PE/PET, and the base layer 40 comprises activated carbon. The bi-component layer 30 may be treated with an anti-microbial substance. As shown in FIG. 2, the bi-component layer 30 may also be alternatively formed using a low melt adhesive web. Additionally, the base layer activated carbon may be treated with an anti-microbial substance. FIG. 3 shows a scanning electron microscope micrograph of the filter media shown in FIG. 2.

Figure 4:
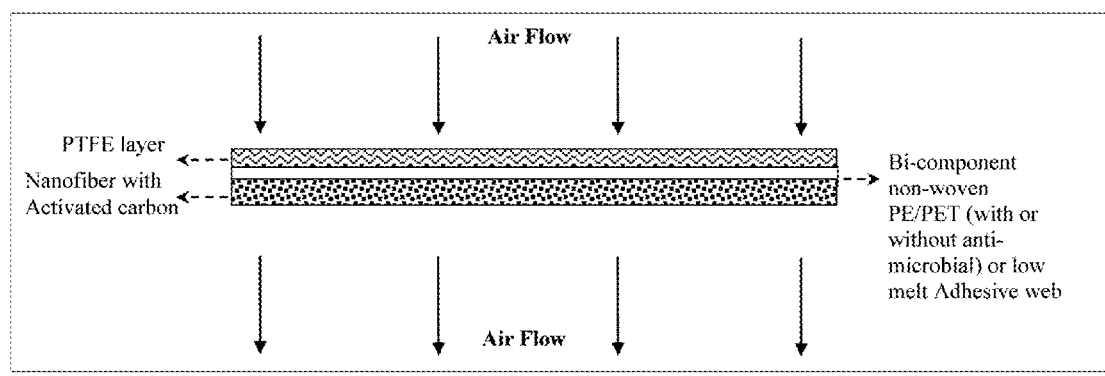
FIG. 4 is a cross sectional view of a multi-layered filter media in accordance with an embodiment of the invention.

In one embodiment, the base layer 40 comprises activated carbon and nanofiber, and the upstream media layer 20 is PTFE, as shown in FIG. 4.

Figure 5:
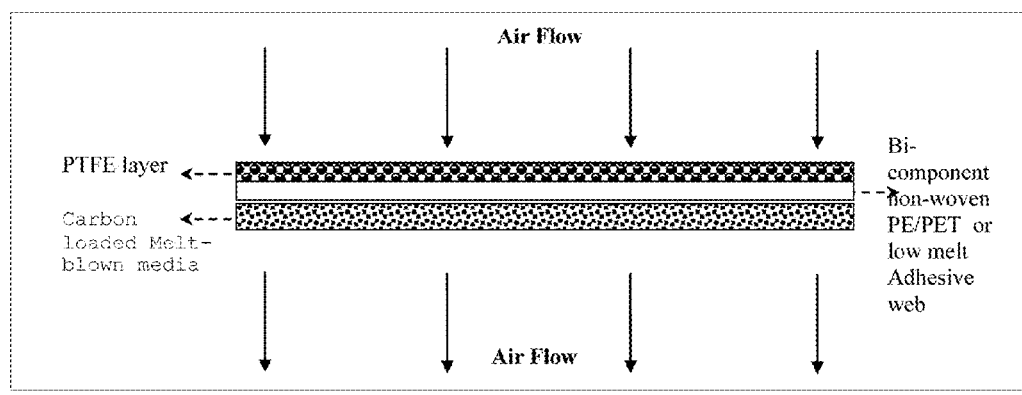
FIG. 5 is a cross sectional view of a multi-layered filter media in accordance with an embodiment of the invention.

In one embodiment, the base layer 40 is melt-blown media with carbon particles, and the upstream media layer 20 is PTFE, as shown in FIG. 5.

Figure 6:
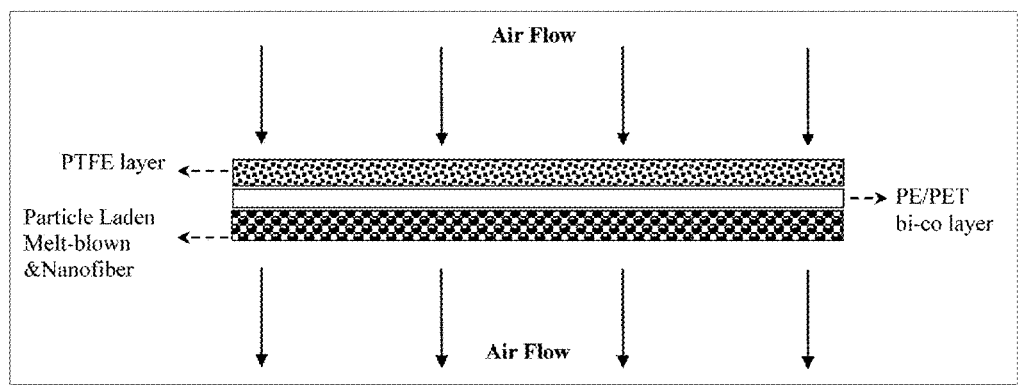
FIG. 6 is a cross sectional view of a multi-layered filter media in accordance with an embodiment of the invention.

In one embodiment, the base layer 40 is particle laden melt-blown nanofiber with carbon particles, and the upstream media layer 20 is PTFE, as shown in FIG. 6.

Figure 7:
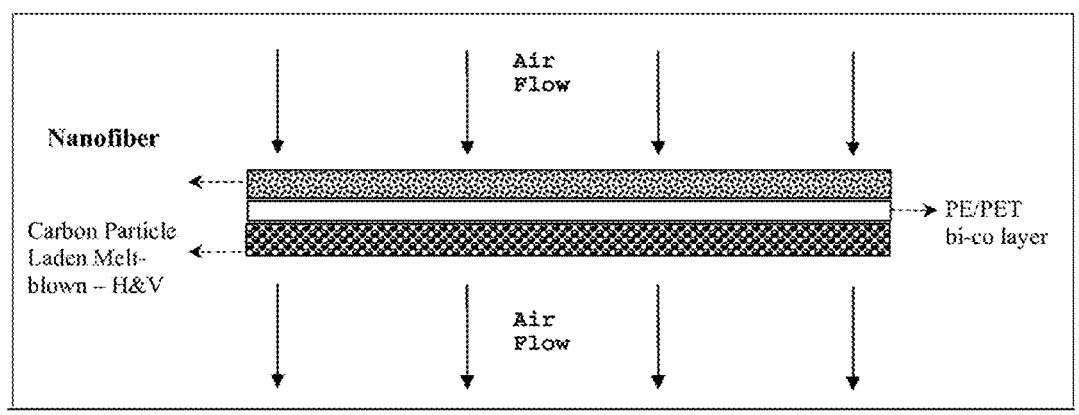
FIG. 7 is a cross sectional view of a multi-layered filter media in accordance with an embodiment of the invention.

In one embodiment, the base layer 40 is particle laden melt-blown material further containing carbon particles, and the upstream media layer 20 is nanofiber created by Donaldson Company, Inc. of Bloomington, Minn. This embodiment is shown in FIG. 7. In one embodiment, the nanofiber may be coated on one side. In another embodiment, the nanofiber may be coated on two sides. In the various embodiments nanofiber media may be co-pleated with other media, such as carbon loaded melt blown media.

Exemplary Materials

The present invention may be constructed with a variety of materials. HEPA filtering material is preferred as, by definition, HEPA filters remove at least 99.97% of airborne particles 0.3 μm in diameter. However, due to the construction of the filter, the starting materials used to construct the filters of the present invention need not be HEPA efficiency in order for the entire filter media construction to be HEPA efficiency. In one embodiment, polytetrafluoroethylene (PTFE) is used for the upstream media layer. Expanded PTFE (ePTFE) may also be utilized in the present invention. Typically, ePTFE media have very high pressure drops and moderate HEPA efficiency.

Alternatively, as shown in FIG. 7, the upstream media layer 20 may comprise nanofiber, such as that created by Donaldson Company, Inc. of Bloomington, Minn. These nanofibers provide a low cost option with mid-range filtration efficiency. Examples of these nanofibers include some coated on one side and others coated on two sides, co-pleated or bonded with melt-blown carbon media. The melt-blown carbon media is available from a variety of commercial sources, such as Hollingsworth and Vose of East Walpole, Mass.

In one embodiment, the bi-component layer 30 may comprise polyethylene/polyethylene terephthalate (PE/PET). In another embodiment, the bi-component layer 30 may comprise a low melt adhesive web.

In one embodiment, the base layer 40 comprises activated carbon. In a preferred embodiment, the base layer 40 comprises a minimum of 45% activated carbon. The base layer may be produced with or without anti-microbial treatment. Alternatively, the base layer 40 comprises nanofiber with activated carbon. In this application, the nanofibers serve a multifunctional purpose: in addition to helping to capture airborne contaminants that escape ePTFE film, the nanofibers cause the overall pressure drop to be lower than if PTFE film alone is used. Consequently, use of these materials does not necessitate that the starting PTFE film be HEPA efficiency.

In another embodiment, the base media 40 comprises melt-blown media with carbon particles. The melt-blown media with carbon particles serves dual purposes: not only does it aid control odor, it also helps to capture airborne contaminants that escape the ePTFE film layer. Furthermore, the overall pressure drop is lower than if PTFE film alone is used, so the starting PTFE film need not be HEPA efficiency.

In yet another embodiment, the base media 40 comprises carbon particle laden melt-blown media with nanofibers. Such a material is suitable for removing odor with lower pressure drop and higher efficiency. The starting PTFE film of this embodiment need not be HEPA efficiency.

One exemplary material that may be used for the base media 40 is a 2-in-1 carbon substrate developed by Lydall, Inc. of Manchester, Conn. An example of such a material is C-680 ActiPure® media developed by Lydall, Inc. of Manchester, Conn. The ActiPure® media comprises a nonwoven material and activated carbon.

Interbasic Resources Inc. (IBR) performed efficiency and off-gassing tests on media, which is shown in FIGS. 8A and 8B. These tests were developed by IBR for vacuum odor control. For the off-gassing tests, the media was challenged with ammonia and $H_2S$.

FIG. 8A shows the test results from conducting off-gassing tests where the media was challenged with ammonia in order to determine offgassing from a loaded vacuum cleaner filter under static conditions. The contaminant used in the off-gassing test was 50 grams of IEC 60312 household test dust saturated with ammonia at 200 ppm(v). The tests were conducted at 70 degrees Fahrenheit with a relative humidity of 48% and barometric pressure of 736 mmHg. The media samples tested were 12"×12" flat sheet media formed into a pocket and filled with 50 grams of dust.

FIG. 8B shows the test results from conducting off-gassing tests where the media was challenged with ammonia in order to determine offgassing from a loaded vacuum cleaner filter under static conditions. In these tests, the contaminant used in the off-gassing test was 50 grams of IEC 60312 household test dust saturated with $H_2S$ at 200 ppm(v). The tests were conducted at 71 degrees Fahrenheit with a relative humidity of 47% and barometric pressure of 739 mmHg. The media samples tested were 12"×12" flat sheet media formed into a pocket and filled with 50 grams of dust.

Figure 9:
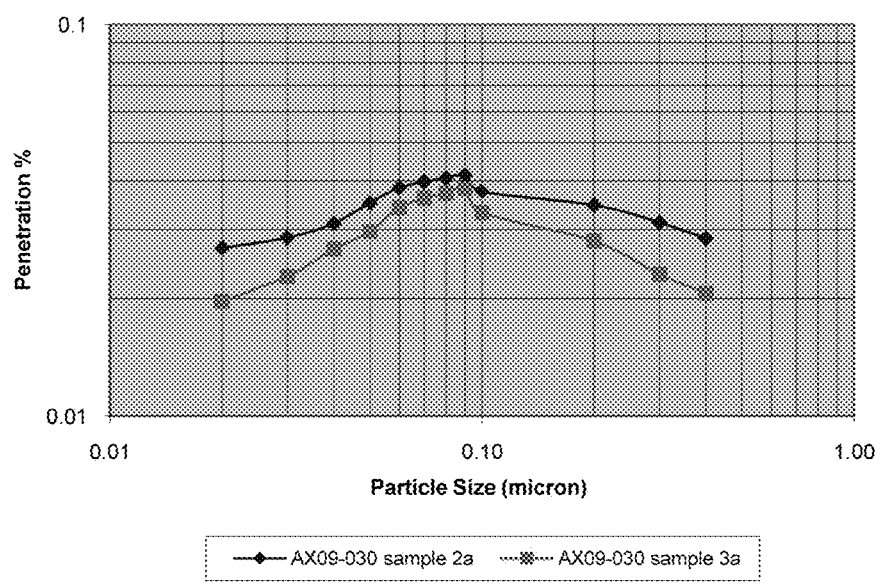
FIG. 9 shows the fractional efficiency for two different samples of the media used in an embodiment of the invention.

Another exemplary material for use in the base media 40 shown in FIG. 9 shows the fractional efficiency of the material for two different samples of the media.

Additionally, the filter media 10 may be treated in any number of ways to improve its efficiency in removing minute particulates and for other purposes. For example, electrostatically treated media can be used, as can cellulose media having one or more layers of fine fiber, or other types of media known to those skilled in the art. The filter media 10 may also be treated with anti-microbial substances to prevent the growth of mold on the filters. Anti-viral or anti-mycotic agents may also be used to treat the filter media 10 to reduce the populations of infectious agents.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive. The scope of the present subject matter should be determined with reference to the appended claims, along with the full scope of equivalents to which such claims are entitled.

What is claimed is:

1. A multi-layer filter media construction comprising:
   an upstream media layer comprising nanofiber,
   a bi-component layer comprising non-woven polyethylene/polyethylene terephthalate, and
   a base layer, wherein the upstream media layer is bonded to the base layer by the bi-component layer.

2. The filter media construction of claim 1, the base layer comprising activated carbon.

3. The filter media construction of claim 2 wherein the base layer comprises a minimum of 45% activated carbon.

4. The filter media construction of claim 2, the base layer further comprising nanofiber.

5. The filter media construction of claim 1, the base layer comprising carbon loaded melt-blown media.

6. The filter media construction of claim 5, the base layer further comprising nanofiber.

7. A method for making a three-layer filter media construction comprising:
   bonding an upstream media layer to a base layer using a bi-component layer under heat and pressure, wherein the upstream media layer comprises nanofiber and wherein the bi-component layer comprising non-woven polyethylene/polyethylene terephthalate.

8. The method of claim 7, the base layer comprising activated carbon.

9. The method of claim 8, wherein the base layer comprises a minimum of 45% activated carbon.

10. The method of claim 8, wherein the base layer further comprises nanofiber.

11. The method of claim 7, the base layer comprising carbon loaded melt-blown media.

12. The method of claim 11, the base layer further comprising nanofiber.

13. A multi-layer filter media construction comprising:
an upstream media layer comprising nanofiber,
a bi-component layer comprising non-woven polyethylene/polyethylene terephthalate, and
a base layer comprising carbon loaded nanofiber.

14. The filter media construction of claim 13, wherein the base layer comprises a minimum of 45% activated carbon.

15. The filter media construction of claim 13, wherein the filter media construction further comprises an anti-microbial treatment.

* * * * *